United States Patent [19]
Johannesen

[11] 3,983,790
[45] Oct. 5, 1976

[54] BRAKE ACTUATOR

[75] Inventor: Donald D. Johannesen, South Bend, Ind.

[73] Assignee: The Bendix Corporation, South Bend, Ind.

[22] Filed: May 27, 1975

[21] Appl. No.: 581,243

[52] U.S. Cl. ............................... 91/422; 91/404; 91/444; 91/449
[51] Int. Cl.² .................. F15B 11/08; F15B 13/04
[58] Field of Search ............. 91/224, 449, 450, 451, 91/422, 444, 404

[56] References Cited
UNITED STATES PATENTS

| | | | |
|---|---|---|---|
| 1,965,064 | 7/1934 | Zwayer | 91/224 |
| 3,236,157 | 2/1966 | Lovell et al. | 91/224 |
| 3,361,036 | 1/1968 | Harvey et al. | 91/224 |
| 3,789,737 | 2/1974 | Burnett | 91/422 |

Primary Examiner—Paul E. Maslousky
Attorney, Agent, or Firm—Ken C. Decker; William N. Antonis

[57] ABSTRACT

A brake actuator for a vehicle having air brakes is disclosed in which air pressure is expelled through the actuator upon release of the brakes in order to purge the latter of contaminants. The actuator includes a housing in which a piston reciprocates. Fluid pressure is admitted to the chamber defined between one side of the piston and the corresponding end of the housing in order to urge the latter in a brake actuating direction. The piston includes a passage extending therethrough to connect the chambers defined between opposite sides of the piston and the corresponding ends of the housing, and a shuttle valve carried within the passage in order to close the passage upon brake application and open the passage to permit fluid communication between the chambers upon brake release. An articulated guide rod is pivotally mounted on the end wall of the housing and extends into the piston to guide the shuttle valve during operation of the actuator.

10 Claims, 2 Drawing Figures

BRAKE ACTUATOR

BACKGROUND OF THE INVENTION

This invention relates to a brake actuator for use in a vehicle having air brakes, and is of the same general type as the actuator disclosed in U.S. Pat. No. 3,789,737, owned by the assignee of the present invention.

As is well known to those skilled in the art, brake actuators for heavy duty vehicles equipped with air-actuated brakes are located in an extremely adverse environment on the underside of the vehicle, where they are exposed to road dirt, dust, salt, and other contaminants. Furthermore, most existing actuators are designed so that this contaminated atmospheric air is drawn into the actuator upon brake release, thereby damaging the walls of the housing and the seals used within the actuator. Ultimately, of course, the corrosive nature of these contaminants may damage the brake mechanism itself and result in a brake failure. For this reason, it is desirable to design a brake actuator in which the actuator is automatically purged of contaminants on brake release, so that may contamination which might be drawn into the actuator during normal operation of the latter is automatically purged periodically. Furthermore, any type of actuator must be designed so that the actuating piston used within the actuator may articulate with respect to the actuator housing, as many brake actuators, particularly the type used to actuate air-actuated disc brakes, require articulating movement of the piston.

SUMMARY OF THE INVENTION

Therefore, an important object of my invention is to provide a brake actuator for air actuated brakes in which the actuator is purged upon brake release to expel any contaminants which may have been drawn into the actuator, and to prevent contaminants from entering the actuator.

Another important object of my invention is to provide an actuator for air-braked vehicles in which the high pressure fluid communicated into the actuating chamber upon a brake applicaton is purged through the actuator upon brake release.

Still another important object of my invention is to provide a selfpurging actuator in which the piston may articulate with respect to the housing during brake application and release.

DETAILED DESCRIPTION

Figure 1:
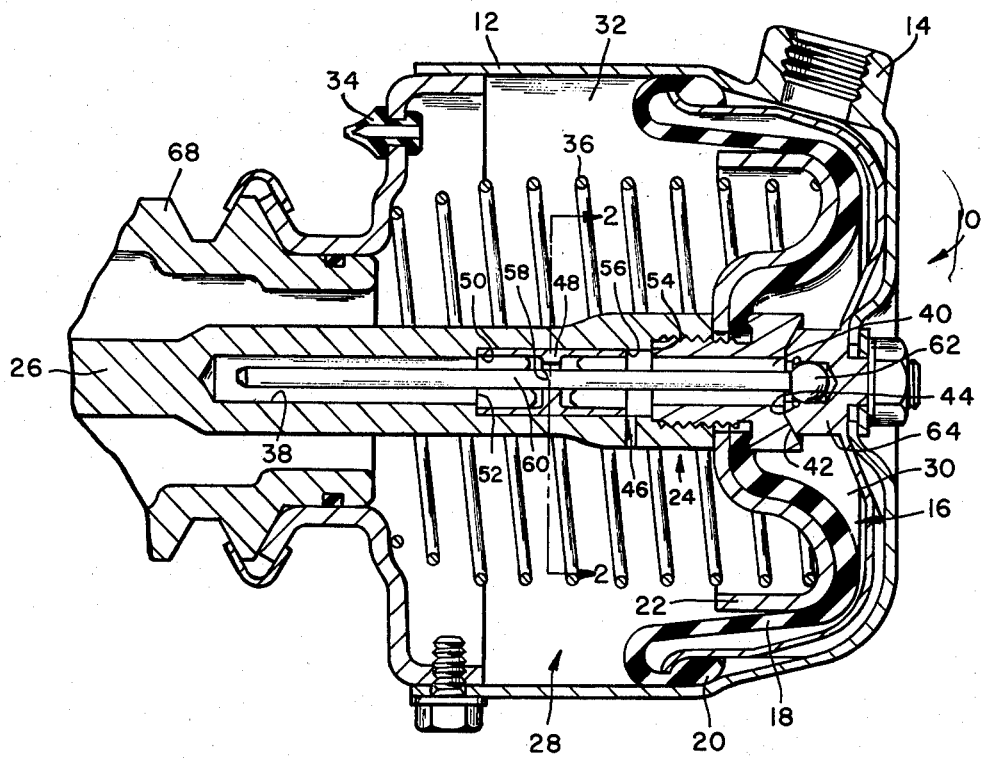
FIG. 1 of the drawings is a longitudinal, cross-sectional view of a brake actuator made pursuant to the teachings of my present invention.
Figure 2:
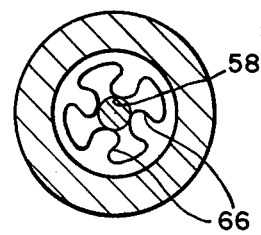
FIG. 2 is a partial transverse cross-sectional view taken substantially along lines 2—2 of FIG. 1.

Referring now to the drawings, a brake actuator generally indicated by the numeral 10 includes a housing 12 provided with an inlet port 14 which is adapted to be communicated to a suitable source of air pressure when a brake application is effected. A piston generally indicated by the numeral 16 includes a flexible diaphragm 18 the periphery 20 of which is attached to the wall of the housing 12 around the entire circumferential surface thereof. The diaphragm 18 is further attached to a metal pressure plate 22 which in turn is connected to a piston rod generally indicated by the numeral 24. The end 26 of the piston rod is adapted to be connected to the appropriate brake actuated mechanism in a manner well known to those skilled in the art. The interior chamber of the housing 12 generally indicated by the numeral 28 is divided by the piston 16 into section 30 which is communicated to the inlet 14 and into a section 32 which is communicated exteriorly of the housing 12 by a oneway check valve 34. Check valve 34 may be of the so-called "duckbill" type disclosed in U.S. Pat. No. 3,122,161, owned by the assignee of the present invention incorporated herein by reference. Since this check valve forms no part of the present invention, it will not be described more completely herein. The valve 34 permits communication from the section 32 into the atmosphere surrounding the housing 12, but prevents the atmospheric air from being drawn into the chamber 28. A spring 36 located in the section 32 yieldably urges the piston 16 to the rest or brake-released position illustrated in the Figure.

The piston rod 24 defines a bore 38 therewithin, whereas an open end 40 is adapted to communicate with the section 30. However, a valve seating area 42 is carried on the piston rod 24 which circumscribes the open end 40 and which is adapted to sealingly engage a corresponding valve seating area 44 carried on the housing 12. Therefore, when the piston 16 is disposed in the rest position illustrated in the drawings, the seat 42 is sealingly engaged with the seat 44, to prevent fluid pressure admitted into the section 30 from communicating into the bore 38. An opening 46 extends radially to the wall of the piston rod 24, to communicate the bore 38 with the section 32. A shuttle valve 48 is slidably mounted in the bore 38, and is freely reciprocable within the latter between a first abutment 50 carried by the bore 38 which is adapted to engage the end 52 of shuttle valve 48 and a second abutment 54 which is adapted to engage the opposite end 56 of the shuttle valve 48. The shuttle valve 48 further includes an axial opening 58 which is adapted to slidably receive an articulated guide rod 60. One end 62 of the guide rod 60 is pivotally mounted to the end wall of the housing 12 by a fixture 64, so that the guide member 60 may articulate with respect to the housing. As can be seen from the drawing, the guide member 12 is an elongated rod which extends through the major portion of the axial length of the bore 38. The shuttle valve 48 includes a series of circumferentially spaced fingers 66 which define the opening 58 and which are adapted to grippingly engage the guide member 60. Preferably, the fingers 66 are made of plastic or some other resilient material, so that the fingers 66 may grippingly engage the guide member 60, but which will yield when a predetermined force is applied to the shuttle valve 48 to permit relative movement between the shuttle valve 48 and the guide member 60.

MODE OF OPERATION

As discussed hereinabove, the various components of the actuator 10 are illustrated in the Figures in the positions which they assume when the brakes of the vehicle are released. When a brake application is to be effected, high pressure air is communicated through the inlet port 14 into the section 30 of the chamber 28. High pressure air acts upon the diaphragm 18 of piston 16, to overcome the force of the spring 36 and to thereupon urge the piston 16 to the left viewing the Figure, thereby effecting a brake application. It will be noted that initially the valve seats 42 and 44 are engaged with one another to prevent communication into the bore 38. However, upon the initial movement of the piston 16, the bore 38 is communicated with the high pressure air in the section 30. It will also be noted that, in this condition, the opening 46 communicates with the bore 38, but because the cross-sectional area of the opening 46 is relatively small compared with the volume of the section 30, no appreciable quantity of fluid can communicate through the opening 46 before the piston moves a distance great enough to cause the shuttle valve 48 to overlap the opening 46 and thereby terminate fluid communication between the chambers 30 and 32. As discussed hereinabove, there is a free-sliding connection between the outer circumferential surface of the shuttle valve 48 and the wall of the bore 38, but the resilient fingers 66 grippingly engage the guide member 60, so that, upon initial movement of the piston 16, the shuttle valve 48 will slide relative to the piston, but will not move relative to the guide member 60. This permits the shuttle valve 48 to close the opening 46. When the shoulder 54 on the piston rod 24 engages the end 56 of the shuttle valve 48, the relatively high force applied by the piston 16 overcomes the gripping force of the fingers 66 against the guide member 60, causing the shuttle valve 48 to travel with the piston 16 through the remainder of its actuating stroke. It should be noted that, of course, during this actuating stroke, the check valve 34 will permit escape of the residual air in section 32 to the exterior of the housing 12.

Upon brake release, the pressure level in the section 30 is reduced, permitting the spring 36 to urge the piston 16 to the right viewing the Figure, towards the rest position illustrated in the drawing. The shuttle valve 48 slides relative to the piston rod 24 until the abutment 50 on the piston rod 24 engages the end 56 of the shuttle valve 48, whereupon the resilient force exerted by the fingers 66 on the guide rod 60 is overcome so that the shuttle valve 48 moves with the piston 16. As the shuttle valve 48 slides between the detent 54 and the abutment 50, the opening 46 is communicated with the bore 38, to thereby communicate the fluid pressure content of the chamber 30 with the chamber 32. Any residual high pressure fluid remaining in the chamber section 30 of chamber 28 will be communicated through the check valve 34 to the exterior of the vehicle, thereby purging the sections 30 and 32 of the chamber 28 of any contaminants. Since the check valve 34 prevents contaminants from being drawn into the chamber 28, the purging action will mainly expel fluid condensation. It will be noted that, because of the articulated connected between the pivot 62 and the fixture 64, the piston may articulate to a limited degree with respect to the housing 12. This permits the piston to be connected to virtually any type of brake actuator, as many brake actuating designs, particularly those used with air-actuated disc brakes, require that the piston articulate slightly as the mechanism is stroked. Furthermore, since the neck 68 of the housing 12 is connected directly to the housing of the brake, the purging capabilities of the actuator 10 are especially important when the latter is used in air-actuated disc brakes, since the relatively complicated force transmitting and multiplying mechanism is particularly sensitive to corrosion caused by condensation or other contaminants which might be present within the actuating housing.

I claim:
1. In a fluid actuator:
a housing defining a chamber therewithin;
a piston slidably mounted in said housing and dividing said chamber into a pair of sections;
means for admitting pressurized fluid into one of said sections to drive said piston in an actuating direction;
resilient means yieldably urging said piston in a return direction opposite said actuating direction to a rest position;
passage means extending through said piston communicating said sections;
valve means for closing said passage means upon movement of the piston in the actuating direction and opening said passage means during movement of said piston in said return direction;
said valve means including a shuttle element slidably carried by said piston and slidable with respect thereto to open and close said passage means, a guide member carried by said housing and mounted for articulation with respect thereto, means mounting the shuttle element on said guide member, said mounting means including means resisting movement of said shuttle element with respect to said guide member.
2. The invention of claim 1:
said piston including a piston rod defining a bore therewithin, said shuttle element being slidably mounted in said bore.
3. The invention of claim 2:
said guide member being an elongated element extending into said bore to engage said shuttle element, the length of said guide member being longer than the stroke of said piston.
4. The invention of claim 3; and
a pair of abutments carried in said bore for engagement with said shuttle element, said abutments being spaced apart a distance greater than the axial length of said shuttle element whereby said shuttle element is permitted to move relative to said piston for a predetermined distance.
5. The invention of claim 4:
said passage means including an opening in the wall of said bore communicating the latter with said other section, said opening being located between said abutments in a position wherein said shuttle element overlaps said opening when the shuttle valve engages one of said detents and said shuttle valve is disposed away from said opening when the shuttle valve engages the other of said detents.
6. The invention of claim 2:
said shuttle element being an annular element defining an axial opening receiving said guide member.
7. The invention of claim 6:
said means resisting movement of said shuttle element including resilient fingers defining the wall of said axial opening, said fingers being adapted to grippingly engage said guide member, but yielding to permit relative movement between the shuttle element and the guide member.
8. The invention of claim 3; and
means pivotally mounting said guide member to the wall of said housing.
9. The invention of claim 5:
one end of said bore communicating with said one section, and valve means carried by said housing and by said piston for closing said one end of said bore when said piston is disposed in said rest position.

10. The invention of claim 2:
one end of said bore communicating with said one section, and valve means carried by said housing and by said piston for closing said one end of said bore when said piston is disposed in said rest position.

* * * * *